Patented Jan. 25, 1944

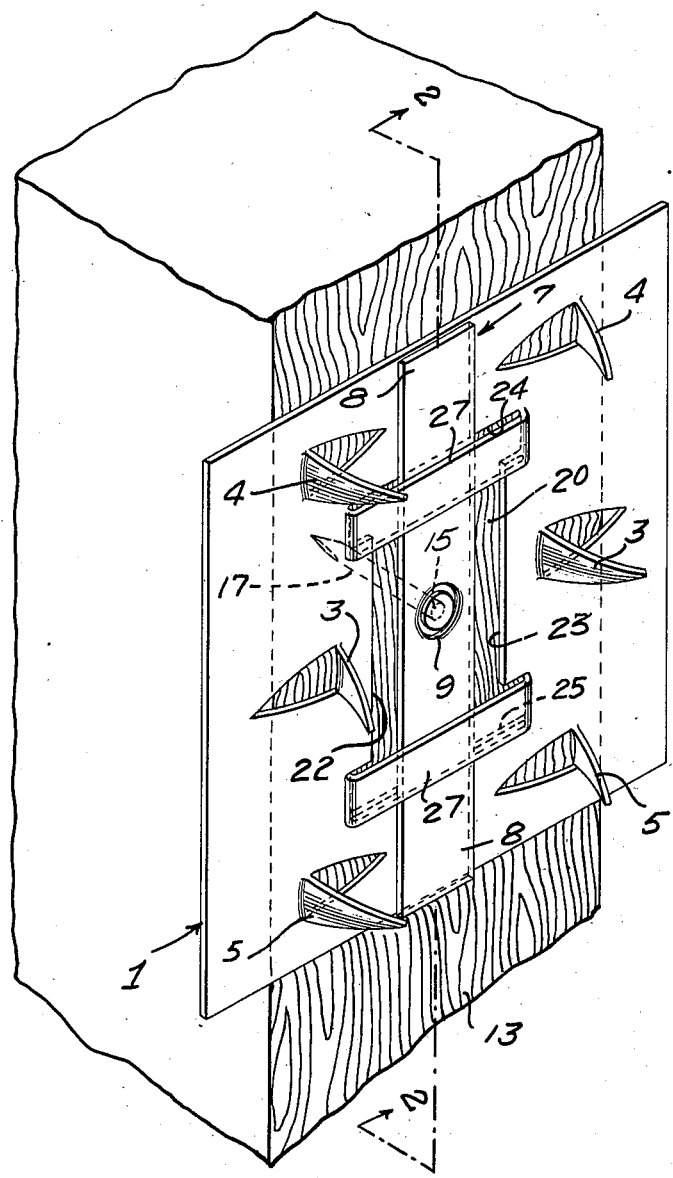
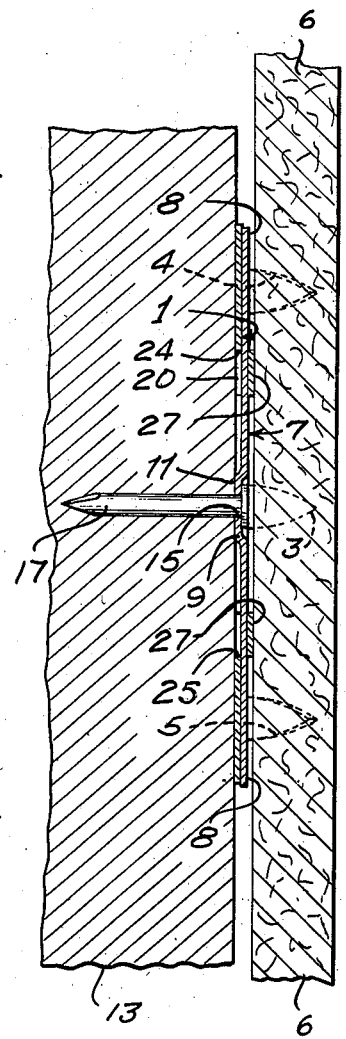

2,339,841

UNITED STATES PATENT OFFICE 2,339,841

WALL STRUCTURE AND FASTENER

Philip G. Deuchler and William A. Moore, Buffalo, N. Y., assignors to Certain-Teed Products Corporation, New York, N. Y., a corporation of Maryland Application October 7, 1941, Serial No. 413,918

3 Claims. (Cl. 72—118)

This invention relates to constructions utilizing covering materials in sheet form erected upon a supporting structure and to devices for fastening such sheet covering materials to the support.

Covering materials, such as panels or wallboards, commonly are erected upon a supporting structure, usually in the form of a frame consisting of spaced supports, by driving nails or similar fasteners through the panels to engage the support behind the panel. In many cases such fasteners, driven through the panels along the edges where two panels meet upon a support, are covered by a covering strip or other means used to cover the joint formed between said edges. Where, however, panels of relatively great width spanning across spaced supports are used, it is necessary to fasten the panel in its central portions to the intermediate supports. Nails or similar fasteners driven through the faces of the panel at these supports then become conspicuous and require to be covered with cement or other means of hiding the nail heads which will conform to the surface of the panel and so that the panel may receive a finishing material such as paint.

Heretofore devices have been proposed for fastening such panels to supports without having the fastener pass through the material of the panel in order to avoid the operations of hiding and finishing at the fasteners. In some of these devices prongs are arranged upon the device upstanding therefrom in such a way as to enter the rear face of the panel and hold it to the support. In order to obtain secure fastening by such devices usually the prongs have been so formed that they may bend somewhat, as the pressure is put upon the front face of the panel to force the prongs to enter at the rear face, so as to lock into the material of the panel.

In some devices as heretofore proposed, in order to secure the device to the support, a fastener such as a nail has been driven through an opening therein to securely hold the fastener to the support before application of the panel. In such constructions, however, no provision is made for movement of the supports relative to the panel or of the panel relative to the supports and in many cases buckling or breakage of the panel or pulling thereof away from the device has occurred. In order to obviate this difficulty, in some devices of the prior art it has been proposed that a plate having a relatively large extent shall be fastened to the support, such as a stud, by means of nails driven therethrough and with a smaller part carrying the gripping or clutching prongs arranged for movement relative to the plate. In such devices the fastening to the supports or studs is strong but the fastening to the rear face of the panel is much weaker than the fastening to the stud because a sufficient number of prongs having sufficient spacing therebetween could not be provided upon the small part referred to. The grip upon the panel is insufficient in many cases effectively to hold the panel under strains due to expansion and contraction caused especially by temperature and humidity changes or by settlement and warping of the supporting structure.

It is an object of the invention to overcome the difficulties of the prior art devices and to provide a device in which the fastening to the stud will be sufficiently strong to hold the panel construction at all places of fastening. The grip by means of the prongs entering the rear face of the panel, however, will be accomplished with a large number of prongs positioned in spaced relation over a substantial area to securely hold the panel to the device. In addition, the device is so constructed that the portion which grips the panel is movable substantial distances in the direction parallel to the face of the panel relative to the portion which is fastened to the support. This allowance for relative movement of the two parts of the device, each of which are firmly fastened to the respective parts of the structure, namely, the panel and the support, provides for movement of the two parts produced by the various causes above mentioned to relieve strain.

It is a feature of the device that a plate of substantial extent carries the prongs and has means thereon for slidably engaging a bridle piece which is fastened firmly to the support, such as the stud. The plate has an aperture centrally thereof, which permits a substantial amount of movement of the plate relative to the bridle piece and its fastener. This movement is possible in all directions, the space provided by the aperture extending all about the fastener and such portions of the bridle piece as may pass through the aperture to bear upon the stud. The bridle piece is of such proportions as to have the portions thereof which are outwardly positioned from the center overlap upon the face of the plate. These outwardly positioned portions of the bridle piece are offset with respect to the central portion thereof in order that this central portion passing through the aperture may firmly engage the stud without causing the outward portions to bind upon the face of the plate. Thus the plate may move relative to the bridle piece and its fastener within the limits of the dimensions of the aperture. The plate is not fastened to and does not become bound firmly by friction to the face of the support although it cannot pull away from the support, being held in contact therewith by the bridle piece and its fastener. The prongs upstanding from the face of the plate enter the rear face of the panel when the panel is pressed thereagainst. After the device has been fastened to the support a slight bending of the prongs may occur or be secured by proper pressure or by striking the face of the panel with suitable means.

The invention will be further understood from the description to follow of the drawing, in which Fig. 1 shows an isometric view of the plate and bridle piece assembled and fastened to a stud.

Fig. 2 shows a longitudinal section on line 2—2 of Fig. 1.

In Fig. 1 the plate 1 is shown of rectangular form having upstanding from the face thereof the prongs 3, 4 and 5 of generally triangular shape and curved relative to the direction normal to the plate. The prongs 3 are faced in the opposite direction from the prongs 4 and 5. It will be noted that the prongs 4 and 5 relative to each other are spaced apart substantial distances and are adjacent the corners of the rectangle so that the points of grip of the wallboard are separated from each other the better to hold the board to the plate. This feature, with the assistance of the intermediate prongs 3 provides a secure fastening to the panel 6 of the plate 1. The prongs 3, 4 and 5 do not penetrate through to the exposed face of the board. The prongs 3 are located on the transverse center line of the plate and preferably in somewhat staggered relation to the lines between the prongs 4 and 5. These prongs may be cut out of the plate metal by a method utilizing a suitable die.

In the embodiment illustrated, located substantially on the center line of the plate parallel to the rows of prongs 3, 4 and 5 is a bar or bridle piece 7 of generally flat form with the portions 8 of this bridle piece which are outwardly located from the center of its length lapped upon the face of the plate 1 from which the prongs 3, 4 and 5 upstand. The piece 7 has a central portion 9 which may be formed by a suitable die-stamping or other operation as a boss. The face 11 of the boss 9 on that side of the bridle piece which bears upon the plate 1 is preferably generally parallel to the face of the bridle piece and therefore to the face of the plate. The face 11 is offset such an amount that it will bear upon the surface of a support, such as a stud 13 illustrated in Fig. 1.

Through a hole 15 centrally of the boss 9 a nail 17 may be driven with its head in the countersunk portion of the bridle piece 7. This nail may be driven into the face of the stud 13 when a wood stud is used as in common frame construction. If desired, however, with other types of studs or supports a different form of the fastener 17 may be inserted through the hole 15 to secure the bridle piece 7 to the support.

The offset of the boss 9 may be such that although the outward portions 8 of the piece 7 may be in overlapping contact with the face of the plate 1 they do not so tightly bear against this face, when the face 11 of the boss 9 is in firm contact with the stud 13, that the plate 1 is held by friction against movement. It will be understood that a sliding contact may be secured between the bridle piece 7 and the plate 1 by suitably determining the offset of the boss 9 in consideration of the thickness of the plate 1. It is a feature of the invention that provision is made for this sliding relation between the plate 1 secured to the back face of the panel and the bridle piece 7 firmly secured to the support.

In order to provide for the requisite amount of movement of the plate 1 relative to the bridle piece, the plate is formed with a central aperture 20. The dimensions of this central aperture are such that a substantial amount of clearance is provided around the boss 9 in all directions. Thus, when the bridle piece 7 is securely fastened to the stud or support, the plate 1 may be moved laterally as shown in Fig. 1 until the sides 22 and 23 of the aperture come in contact with the boss 9. Correspondingly the plate 1 may be moved in the direction parallel to the rows of prongs 3, 4 and 5 until the edges 24 and 25 come in contact with the boss 9. Combinations of the movements in these directions may occur. The length of the bridle piece 7 is such that its end portions 8 remain lapped upon the plate when the plate has moved to the full extent, bringing the boss 9 into contact with either edge 24 or 25.

In order to keep the bridle 7 in position with its length generally in the direction parallel to the rows of prongs 3, 4 and 5 and to avoid jamming and other dislocation which might be caused by stress put upon the device because of expansion or contraction of the wallboards or because of the movement of the supporting structure, bridge pieces 27 are formed in the plate 1 bridging over the end portions of the bridle 7. These bridge pieces may be formed by means of dies at the time of forming the aperture 20 and the prongs 3, 4 and 5. The bridge pieces in the particular embodiment illustrated in Figs. 1 and 2 extend transversely of the direction of the piece 7 across the end portions of the aperture 20. The longitudinal portions of these bridge pieces in this embodiment are offset from but are substantially parallel to the face of the plate 1. This offset is of an amount which will permit the bridle 7 to move beneath the bridges while being held thereby in sliding contact with the face of the plate 1.

In view of the length of the bridle in relation to the length of the aperture 20 and the length of the span of the bridge pieces 27 the bridle 7 cannot move from under the bridge pieces when the bridle piece has been fastened to the support. Thus, there is provided means for keeping the plate in its intended relation to the stud and preferably bearing against the face thereof without undue friction which would prevent movement between the stud and the plate. The aperture 20 in the plate 1, however, is not made so large that rigidity of the plate for bearing against and holding the panel to the stud or support is lost. It therefore is possible to force the prongs into the back face of the panels, after the device has been fastened to the stud or support in the manner above described, with full bearing upon the face of the stud or support to back up the pressure which it is necessary to place upon the front face of the board to force the prongs into its back face.

A further advantage of the device is that it may be assembled in the shop with the bridle piece 7 inserted beneath the bridge pieces 27 ready for application to the studs or supports. Application then may be accomplished by the workman simply by holding the device against the face of the stud at the proper place thereon and driving the nail through the hole 15. The clearance between the bridle 7 and the face of the plate 1 and between the bridle 7 and the bridge pieces 27 may be such that a slight amount of friction may be present after the bridle 7 has been securely fastened to the stud or support. This will make it possible for the plate 1 to be moved by hand into its proper relation to the bridle piece, for example into symmetrical relation thereto, so that the panels or boards may be placed against the supporting structure and the prongs immediately forced into the rear faces of the panels by pressure upon the outer face of the panel. The slight friction will hold the weight of the plate to prevent its movement out of the desired initial placement. This may be accomplished without interfering with movement of the panels relative to the supports in any direction under stress brought thereon, there being adequate space around the boss 9 in any direction for such movement when the boss is thus initially centrally located in the aperture 20.

While variation may be made in the dimensions and form of the plate and of the bridle piece and of the bridge pieces for holding the bridle in proper relation to the plate, the invention includes any device which has a member free of direct fastening to a support but carrying means for firmly gripping a panel at its rear face at relatively widely spaced points upon the member, which member is held in place upon the support by another member but providing movement relative to the first member generally parallel to the wall face, this other member being firmly secured to the supporting structure. It is important, however, that the other member, that is, the bridle 7 shall be sufficiently strong and stiff to hold the device and the panels or wallboards gripped thereby to the supports in proper alignment with the face of the wall while permitting the relative movement between the panels and the support. By providing the prongs at sufficient spacings upon the plate, which itself bears against the support, such alignment and secure hold is obtained. The bridle piece 7 may be made of sufficient thickness in consideration of its width and length and having regard to the thickness of the bridge pieces to accomplish firm holding of the device and the boards to the support and without unduly spacing the boards from the supports because of the intervening material of the device.

In a practical example, such as is illustrated in the drawing, the thickness of the plate may be of .025" to .035". The same thickness may be provided for the bridle piece. The space between the face of the plate 1 and the under face of the bridge pieces 27 may be such as to provide a clearance of .002" to .003" for the bridle piece 7. This clearance may be secured between the under face of the bridle 7 and the face of the plate by providing an offset for the face 11 of the boss 9 of .002" to .003" greater than the thickness of the plate 1. In such a practical embodiment the length of the plate 1 parallel to the length of the bridle 7 may be 2½ inches for a device to be used on wood studs. The width of the plate 1 in consideration of the desired spacing between the rows of prongs 3, 4 and 5 and of the usual width of wood studs may be 2⅜". With a bridle 7 of about ⅜" in width the boss 9 may be about ¼" in diameter. The width of the aperture 20 may be of the degree of ⅝" to ¾", the length of the aperture 20 being about 1" to 1⅜". These dimensions are merely typical and are not intended to limit the invention, the features of which have been set out above.

Having thus described my invention, I now claim:

1. A device for fastening a panel to a support behind the panel which comprises a flat plate having a central aperture of generally rectangular shape, said plate having arranged about said aperture and upstanding from the same face thereof prongs for engagement of the panel through the rear face thereof, said plate carrying adjacent opposite edges of said aperture bridge pieces extending across said aperture and spaced from said face of said plate, and a flat strip inserted beneath the bridge pieces and of a length to lap upon said face of said plate at the portions thereof beyond said opposite edges of said aperture said flat strip upon the face thereof which is in lapping contact with said plate having a central boss extending through said aperture sufficiently beyond the rear face of said plate to engage said support and provide clearance for said plate between said lapping portions of said strip and said support, the spacing of said bridge pieces from said face of the plate being insufficient to permit withdrawal of said flat strip and its boss therethrough but sufficient to provide for sliding movement of the plate and strip relative to each other, the width of the strip being less than the length of the bridge pieces to provide for lateral movement of said strip, the length of said strip being sufficient to maintain lapping engagement with said face of the plate when the central boss of said strip is adjacent one of said opposite edges of the rectangular aperture.

2. A device for fastening a panel to a support positioned behind the panel which comprises a bridle piece formed with a central portion having an opening therein for a fastener to pass therethrough to hold said central portion in firm engagement with said support, said bridle piece also being formed with portions thereof extending oppositely outwardly from said central portion and offset with respect thereto, a plate having an aperture centrally thereof and provided with a plurality of prongs upstanding from a face thereof positioned about said central aperture, said bridle piece being arranged with said outwardly extending portions thereof lapping upon said face of said plate and its central portion extending through said aperture, the dimensions of said aperture with respect to said central portion of said bridle piece being such as to provide for substantial sliding movement of said plate with respect to said bridle piece while maintaining said lapping relation, said offset of said outwardly extending portions of said bridle piece being sufficient to provide clearance between said outwardly extending portions and said plate when said central portion of said bridle piece is in firm engagement with said support, said plate being provided with bridge pieces extending across said outwardly extending portions of said bridle piece and spaced from said face of said plate sufficiently to provide clearance between said bridge pieces and said bridle piece to provide for said sliding movement of said plate relative to said bridle piece but insufficient to provide space for said central portion of said bridle piece to pass through said clearance space, whereby said bridge piece is retained in operable relation to said plate before as well as after erection.

3. A construction for supporting a wall panel in a wall comprising a stud (or beam) having a face parallel to the face of the wall, a plate having an aperture centrally thereof and having one face thereof in contact with said face of the stud and having upstanding from its opposite face prongs positioned about said aperture for engagement with the rear face of the panel placed thereagainst, a bridle piece spanning across said aperture with opposite portions thereof lapping upon said opposite face of the plate and having a central portion extending through said aperture into contact with said face of the stud, said lapping portions of said bridle piece being offset with respect to said central portion so as to provide clearance between said lapping portions and said plate for sliding movement of one in relation to the other, the dimensions in the directions parallel to the face of the plate of said central portion of the bridle piece and of said aperture in relation to each other being such as to provide substantial relative sliding movement of said plate and said bridle piece, a fastener passing through an opening in said central portion of said bridle piece into engagement with said stud to hold said central portion of said bridle piece in firm engagement with said face of the stud, said plate being provided with bridge pieces extending over said lapping portions of said bridle piece and spaced from said face of said plate from which said prongs upstand sufficiently to provide for said relative sliding movement of said bridle and said plate but insufficient to permit withdrawal of said bridle piece and its central portion between a bridge piece and said plate.

PHILIP G. DEUCHLER.
WILLIAM A. MOORE.